United States Patent [19]

Nakajima et al.

[11] 4,066,947

[45] Jan. 3, 1978

[54] STEPPING MOTOR FOR ELECTRONIC TIMEPIECE

[75] Inventors: Fumio Nakajima, Tokyo; Takayasu Machida, Iruma; Kenji Yamada, Koganei, all of Japan

[73] Assignee: Citizen Watch Company Limited, Tokyo, Japan

[21] Appl. No.: 647,282

[22] Filed: Jan. 7, 1976

[30] Foreign Application Priority Data

Sept. 25, 1975   Japan .............................. 50-114897

[51] Int. Cl.² .............................................. H02K 37/00
[52] U.S. Cl. ..................................... 318/696; 318/138;
                                                                310/49 R
[58] Field of Search ........................ 318/138, 696;
                         310/40 MM, 49 R, 162–164; 58/23 D

[56] References Cited

U.S. PATENT DOCUMENTS

| 3,818,690 | 6/1974 | Schwarzschild | 310/49 X |
| 3,878,414 | 4/1975 | Harakawa | 310/164 X |

FOREIGN PATENT DOCUMENTS

| 2,509,883 | 9/1975 | Germany | 310/40 MM |

*Primary Examiner*—Gene Z. Rubinson
*Attorney, Agent, or Firm*—Frank J. Jordan

[57] ABSTRACT

A stepping motor for use in an electronic timepiece in which a rotor is stable on an axis of static equilibrium at an angle from 0° to 30° with respect to a center line of the air gaps between stator pole pieces. The relationship between the stator pole pieces and the rotor is such that the phase difference between driving torque and attraction force applied to the rotor ranges from 60° to 90° by an electrical angle in a normal rotation of the rotor and ranges from 90° to 120° in a reverse rotation of the rotor.

6 Claims, 22 Drawing Figures

STEPPING MOTOR FOR ELECTRONIC TIMEPIECE

This invention relates in general to stepping motors and, more particularly, to a reversible stepping motor for use in an electronic timepiece.

As is well known, stepping motors, also called pulse motors, are becoming increasingly employed in industrial applications due to the introduction of digital pulse techniques. Typical one of these applications involves electronic timepieces having electro-mechanical timekeeping movements which are driven by the stepping motors. Such motors are unidirectional and typically rotate 180° per input pulse. The stepping motor is usually comprised of a rotor and a stator provided with a driving coil. The stator has two pole pieces which are displaced or offset from each other with respect to a central axis between the pole pieces. With this arrangement, it is difficult to assemble the stator pole pieces so as to provide a stable operation of the rotor. In another expedient, the stator pole pieces are integrally formed with one another and shaped by stamping. This requires the provision of a complicated die for the specific stator pole pieces. In addition, the stepping motor of this type can not be driven in the reverse direction due to its inherent construction.

It has heretofore been proposed to provide various types of reversible stepping motors for use in the electronic timepieces. Each of these stepping motors is usually comprised of more than three stator pole pieces and two driving coils which provide a larger construction, and is not suited for the electronic timepieces in which a minimum spacing for the stepping motor is required. Since, further, the stepping motor of this type is driven by four-phase pulses, a driver circuit is necessarily complicated in construction.

It is, therefore, an object of the present invention to provide an improved stepping motor which overcomes the shortcomings encountered in the prior art.

It is another object of the present invention to provide an improved stepping motor which is simple in construction and easy to assemble.

It is still another object of the present invention to provide an improved stepping motor which can be driven in a normal or reverse direction.

It is still another object of the present invention to provide an improved stepping motor which has a single driving coil by which a rotor is rotated in a normal or reverse direction in a simple manner.

It is still another object of the present invention to provide an improved stepping motor for an electronic timepiece in which a static equilibrium axis for a rotor is at an angle between 0° and 30° with respect to the center line of the air gaps formed between two stator pole pieces whereby the rotor is capable of rotating in a normal or reverse direction.

It is a further object of the present invention to provide an improved stepping motor for an electronic timepiece in which stator pole pieces are provided with indents on an axis angled between 60° and 90° with respect to the center line of the air gaps between the stator pole pieces by which a static equilibrium point for a rotor is provided on an axis angled between 0° and 30° with respect to the center line of the air gaps between the stator pole pieces.

It is a still further object of the present invention to provide an improved stepping motor for an electronic timepiece in which stator pole pieces have oval-shaped peripheries diametrically symmetric with respect to each other to provide a static equilibrium point for a rotor.

It is a still further object of the present invention to provide an improved stepping motor for an electronic timepiece in which stator pole pieces have hollow portions formed near the inner peripheries of the stator pole pieces at positions diametrically symmetric to provide a static equilibrium point for a rotor.

These and other objects, features and advantages of the present invention will become more apparent from the following description when taken in conjunction with the accompanying drawings, in which:

Figure 1:
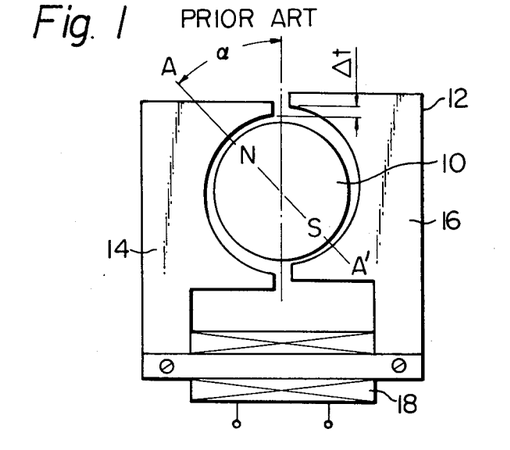
FIG. 1 is a schematic view of a conventional stepping motor used in an electronic timepiece.

Referring now to FIG. 1, there is schematically shown an example of a conventional stepping motor used in an electronic timepiece. As shown, the stepping motor comprises a permanent magnet rotor 10, and a stator 12 including stator pole pieces 14 and 16 which are drien by a driving coil 18. The stator pole pieces 14 and 16 are arranged such that the centers of radius of curvature are offset from each other by a distance Δt and, thus, the rotor 10 may be stable on an axis A-A' of static equilibrium. Consequently, the rotor 10 is rotated in a single direction by applying the alternating current pulses to the driving coil 18 and can not rotate in the reverse direction. Another drawback is encountered with this prior art in that it is difficult to accurately assembly the stator pole pieces.

Figure 2:
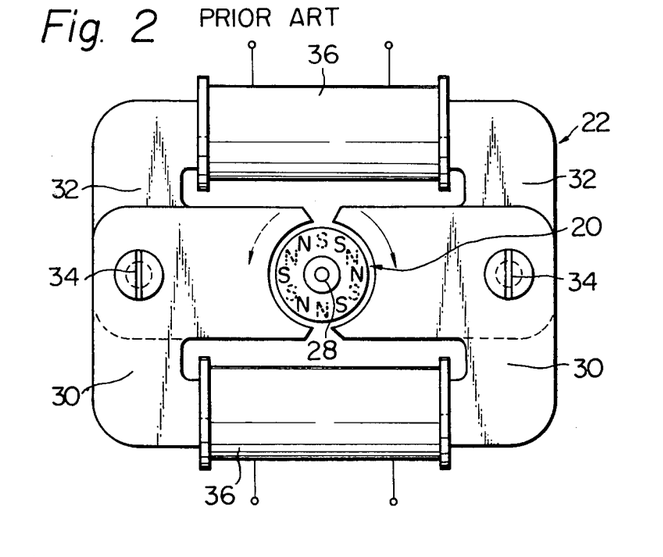
FIG. 2 is a schematic view of another conventional stepping motor used in an electronic timepiece.

FIG. 2 shows an example of a conventional reversible stepping motor. As shown, the reversible stepping motor is comprised of a rotor 20 and a stator 22. The stator 22 comprises four stator pole pieces 30 and 32, which are partly overlapped with each other and magnetically connected to each other by screws 34. Each pole piece is driven by a driving coil 36 wound around a portion of the pole piece. With this construction, the rotor 20 can be rotated in a normal or reverse direction by applying four-phase pulses to the driving coils 36. However, a drawback is encountered with this construction in that the stepping motor is largely sized due to is inherent construction. Thus, the stepping motor of this type is not suited for use in an electronic timepiece such as wrist watch in which a narrow spacing is required for mounting the stepping motor.

Figure 3:
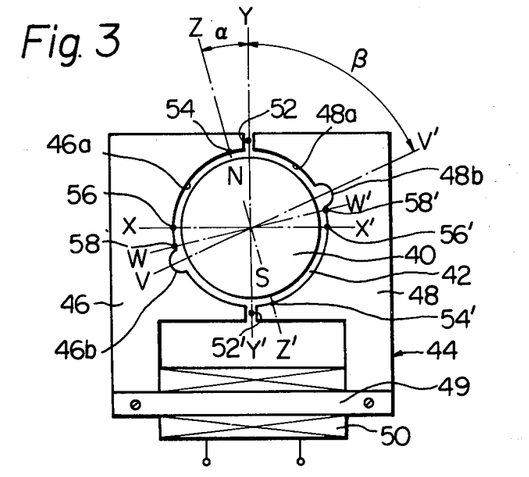
FIG. 3 is a schematic view of a preferred embodiment of a stepping motor according to the present invention.

The present invention contemplates the provision of an improved stepping motor which is simple in construction and easy to manufacture. A preferred embodiment of a stepping motor to achieve the above concept is illustrated in FIG. 3. In this illustrated embodiment, the stepping motor is comprised of a permanent magnet rotor 40 which is rotatably mounted in an air gap 42 provided by a stator 44. The stator 44 comprises stator pole pieces 46 and 48, which are magnetically connected to each other by a magnetically conductive elongated member 49. A driving coil 50 is wound around the magnetically conductive elongated member 49 and energized in a manner as will be described in detail hereinafter. The stator pole pieces 46 and 48 have inwardly rounded peripheries 46a and 48a, respectively, which are symmetric with respect to the center line Y-Y' of air gaps 52 and 52' between the stator pole pieces 46 and 48. In accordance with an essential feature of the present invention, the stator pole pieces have portions providing maximum flux reluctance on an axis at an angle from 60° to 90° with respect to the center line Y-Y' of the air gaps 52 and 52' between the stator pole pieces whereby an axis of static equilibrium for the rotor is at an angle from 0° to 30°. As a result, the phase difference between driving torque and attraction force applied to the rotor ranges from 60° to 90° by an electrical angle in a normal rotation of the rotor and ranges from 90° to 120° in a reverse rotation of the rotor. More specifically, the stator pole pieces 46 and 48 have indented portions 46b and 48b, respectively, on an axis V-V' angled at a predetermined degree of $\beta$, from about 60° to 90° with respect to the center line Y-Y'. With this arrangement, the rotor 40 is static on an axis Z-Z' of static equilibrium at an angle $\alpha$, from about 0° to 30° with respect to the center line Y-Y'. The axis Z-Z' coincides with static equilibrium points 54 and 54' provided on the stato pole pieces 46 and 48, respectively.

Figures 6, 7:
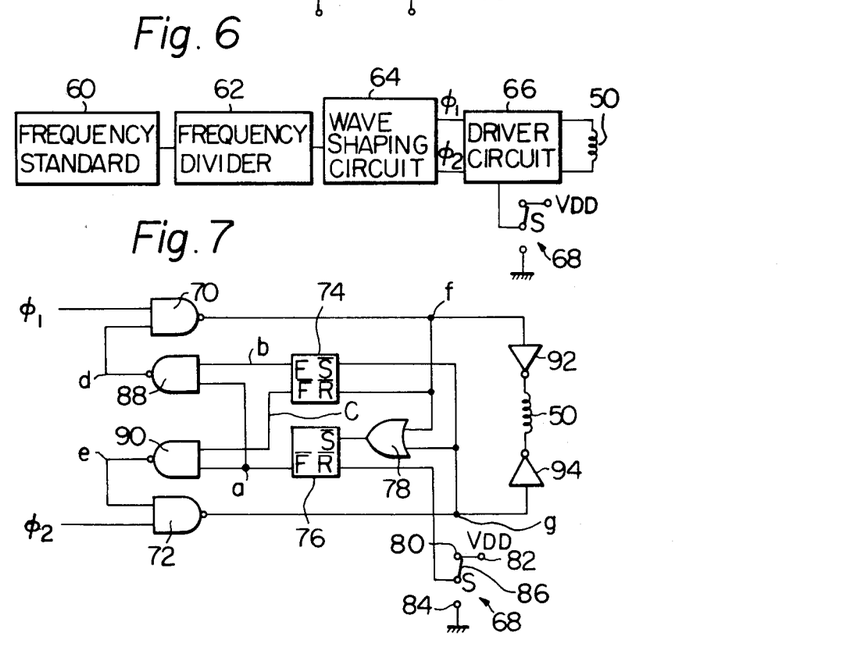
FIG. 6 is a block diagram of an electric circuitry for an electronic timepiece having a driver circuit for the stepping motor shown in FIG. 3.
FIG. 7 is a detail circuit diagram of an example of the driver circuit shown in FIG. 6.

FIG. 6 illustrates a block diagram of an electronic timepiece of the quartz crystal oscillator type incorporating the stepping motor according to the present invention. The electronic timepiece comprises a frequency standard 60 having a quartz crystal (not shown), a frequency divider 62, a wave shaping circuit 64 and a driver circuit 66 connected to a control switch 68 and the driving coil 50 of the stepping motor. As shown in FIG. 7, the driver circuit 66 comprises first and second NAND gates 70 and 72. The first NAND gate 70 receives at its one input a clock pulse $\phi_1$ through by the wave shaping circuit 64, which also passes clock pulse $\phi_2$ which is applied to one input of the second NAND gate 72. The output $f$ of the NAND gate 70 is applied to a reset input of a first flip-flop 74 and to a set input of a second flip-flop 76 through an OR gate 78. The output $g$ of the second NAND gate 72 is applied to a set input of the first flip-flop 74 and to the set input of the second flip-flop 76 through the OR gate 78. A reset input of the second flip-flop 76 is connected to the control switch 68. The control switch 68 has a stationary contact 80 connected to the positive power supply terminal 82, a stationary contact 84 connected to the grounded side of the power supply, and a movable contact arm 86 engageable with either one of the stationary contacts 80 and 84. The output $b$ of the "F" side of the first flip-flop 74 is applied to one input of a third NAND gate 88. The output $a$ of the "$\overline{F}$" side of the second flip-flop 76 is applied to another input of the third NAND gate 88 and one input of a fourth NAND gate 90. The output $c$ of "$\overline{F}$" side of the first flip-flop 74 is applied to another input of the fourth NAND gate 90. The output $d$ of the third NAND gate 88 is applied to another input of the first NAND gate 70. The output $e$ of the fourth NAND gate 90 is applied to another input of the second NAND gate 72. The output $f$ of the first NAND gate 70 is also applied to an inverting amplifier 92 connected to the driving coil 50 of the stepping motor, to which the output $g$ of the second NAND gate 72 is also applied through an inverting amplifier 94.

With this arrangement, the movable contact arm 86 of the control switch 68 is normally held in contact with the stationary contact 80 connected to the positive power supply terminal 82. Under this circumstance, the output $a$ of the second flip-flop 76 is low, and the outputs $d$ and $e$ of the third and fourth NAND gates 88 and 90 are high. In this instance, the outputs $f$ and $g$ of the first and second NAND gates 70 and 72 are alternately applied to the driving coil 50 of the stepping motor which is consequently rotated in its normal direction in a manner as will be described in detail hereinafter.

Figure 8:
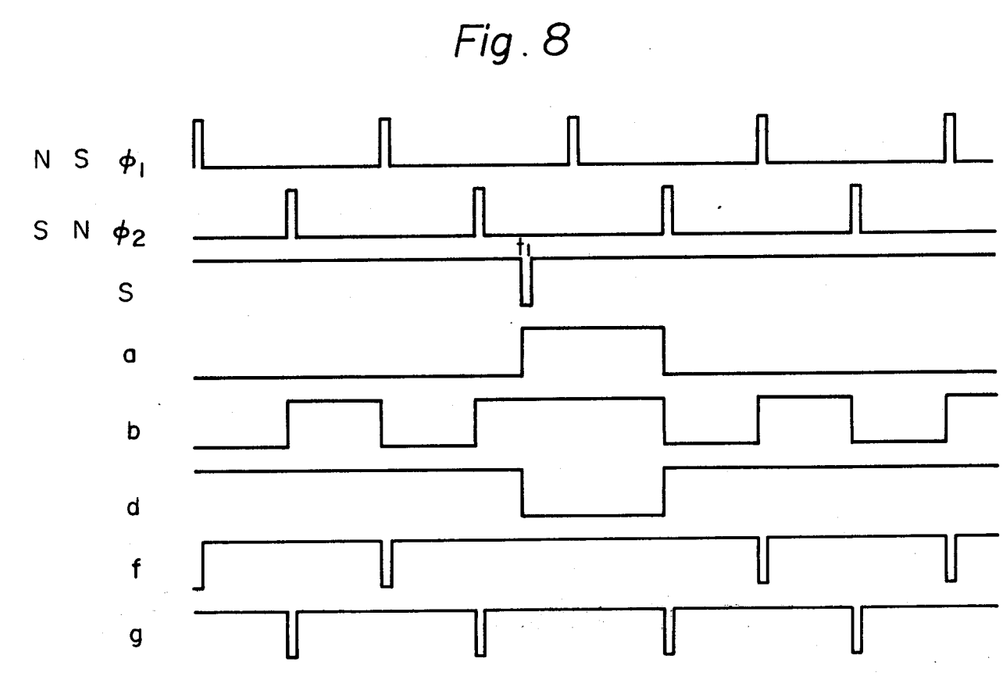
FIGS. 8 and 9 are wave diagrams of various pulses produced in the driver circuit shown in FIG. 7.

In contrast, when the contact arm 86 is brought into contact with the stationary contact 84 connected to the grounded side of the power supply at the time instant $t_1$, the output $a$ of the second flip-flop 76 becomes high as shown in FIG. 8. Since, in this instance, the output $b$ of the first flip-flop 74 is high in response to the input pulse $\phi_2$ applied prior to the time instant $t_1$, the output $d$ of the thid NAND gate 88 becomes low whereby the first NAND gate 70 is inhibited. Since, on the other hand, the output $c$ of the first flip-flop 74 is low, the output $e$ of the NAND gate 90 is high. Thus, the clock pulse $\phi_2$ is gated through the second NAND gate 72 and inverted thereby. The second flip-flop 76 is reset in response to the inverted pulse $\overline{\phi}_2$ and the output $a$ of the second flip-flop 76 becomes low. Therefore, the output $d$ of the third NAND gate 88 becomes so that the clock pulse $\phi_1$ is gated through the first NAND gate 70. Thus, when the control switch is connected to the grounded side of the power supply at the time instant $t_1$, the driving pulse $\phi_2$ is consecutively applied to the driving coil 50 of the stepping motor within a predetermined time interval in a manner as shown by the wave diagram $g$ in FIG. 8. Subsequently, the driving pulses $\phi_1$ and $\phi_2$ are alternately applied to the driving coil 50 by which the rotor is rotated in the reverse direction in a manner as will be described in detail hereinafter.

Figure 9:
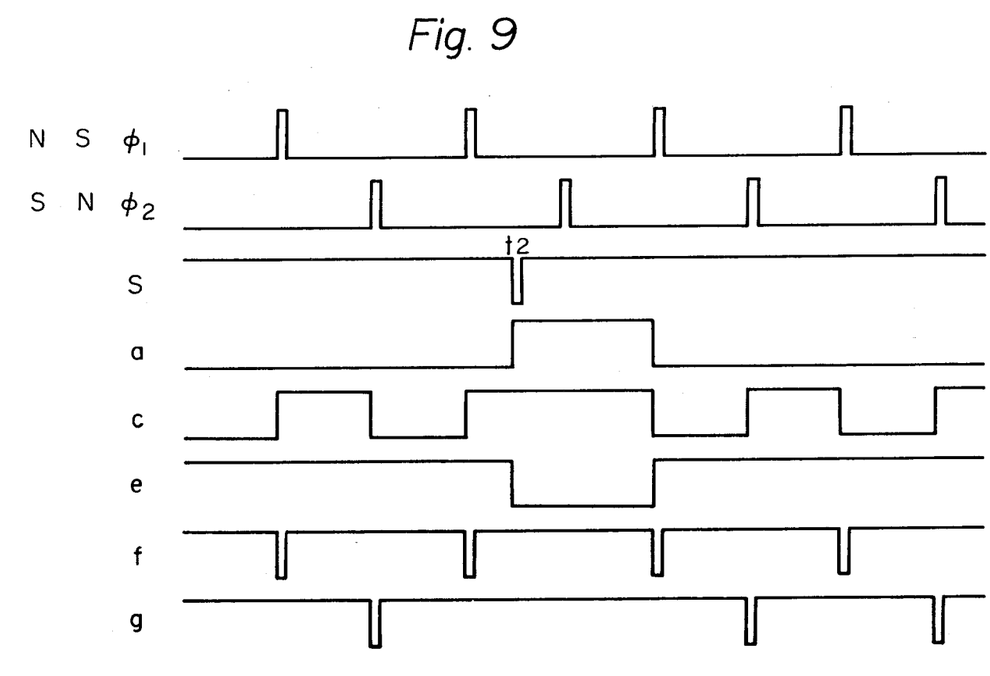

If the contact arm 86 of the control switch 68 is brought into contact with the stationary contact 84 connected to the grounded side of the power supply at a time instant $t_2$ as shown in FIG. 9, the output $a$ of the second flip-flop 76 becomes high. Since, at the same time, the output $c$ of the first flip-flop 74 is high in response to the output $f$ of the first NAND gate 70 applied to the first flip-flop 74 prior to the time instant $t_2$, the output $e$ of the fourth NAND gate 90 is low and the second NAND gate 72 is inhibited as shown by the wave form $g$ in FIG. 9. Since, on the other hand, the output $b$ of the first flip-flop 74 is low, the output $d$ of the third NAND gate 88 is high so that the clock pulse $\phi_1$ is gated through the first NAND gate 70. The output of the first NAND gate 70 is represented by the waveform $f$ in FIG. 9. The second flip-flop 76 is reset in response to the output $f$ of the first NAND gate 70 and the output $a$ is low whereby the clock pulse $\phi_2$ is gated through the second NAND gate. Thus, the driving pulse $\phi_1$ is consecutively applied to the driving coil 50 of the stepping motor within a predetermined time interval in a manner as shown by the wave diagram $f$ in FIG. 9. Thereafter, the driving pulses $\phi_1$ and $\phi_2$ are alternately applied to the driving coil 50 whereby the rotor which had been rotated in the reverse direction is allowed to rotate in the normal direction in a manner as will be described in detail.

Figure 10A:
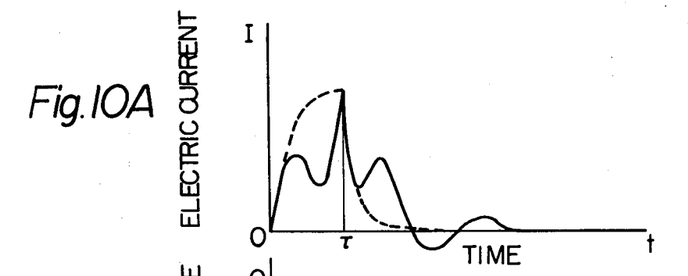
FIG. 10A is a graphical representation of the electric current utilized by the stepping motor shown in FIG. 3 during normal rotation of a rotor.
Figure 10B:
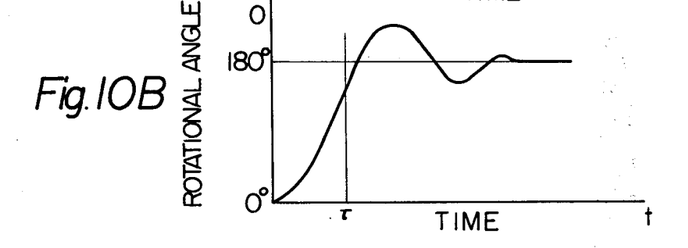
FIG. 10B is a graphical representation of variations in a rotational angle of the rotor rotated by the electric current shown in the graph of FIG. 10A.

FIG. 10A illustrates a graphical representation of the electric current utilized by the stepping motor during its normal rotation. FIG. 10B illustrates a curve indicating a rotational angle of the rotor of the stepping motor when the electric current is applied thereto in a manner as shown in FIG. 10A.

Figure 11A:
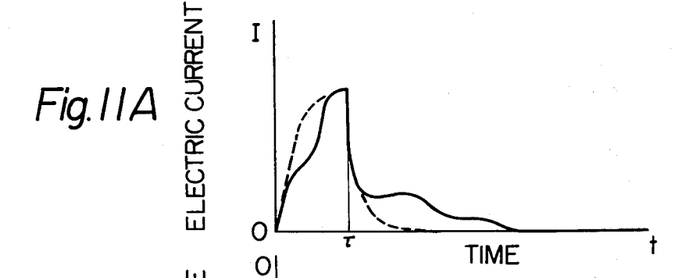
FIG. 11A is a view similar to FIG. 10A but shows a graph of the electric current utilized by the stepping motor shown in FIG. 3 during reverse rotation of the rotor.
Figure 11B:
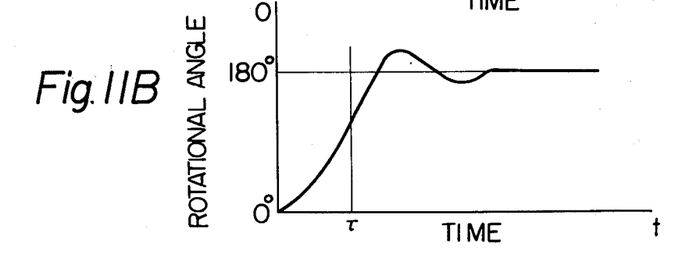
FIG. 11B is a view similar to FIG. 10B but shows the variations in the rotational angle of the rotor rotated by the electric current shown in the graph of FIG. 11A.

FIG. 11A illustrates a graphical representation of the electric current utilized by the stepping motor during its reverse rotation. FIG. 11B illustrates a rotational angle of the rotor of the stepping motor when the electric current is applied thereto in a manner as shown in FIG. 11A.

Figure 12:
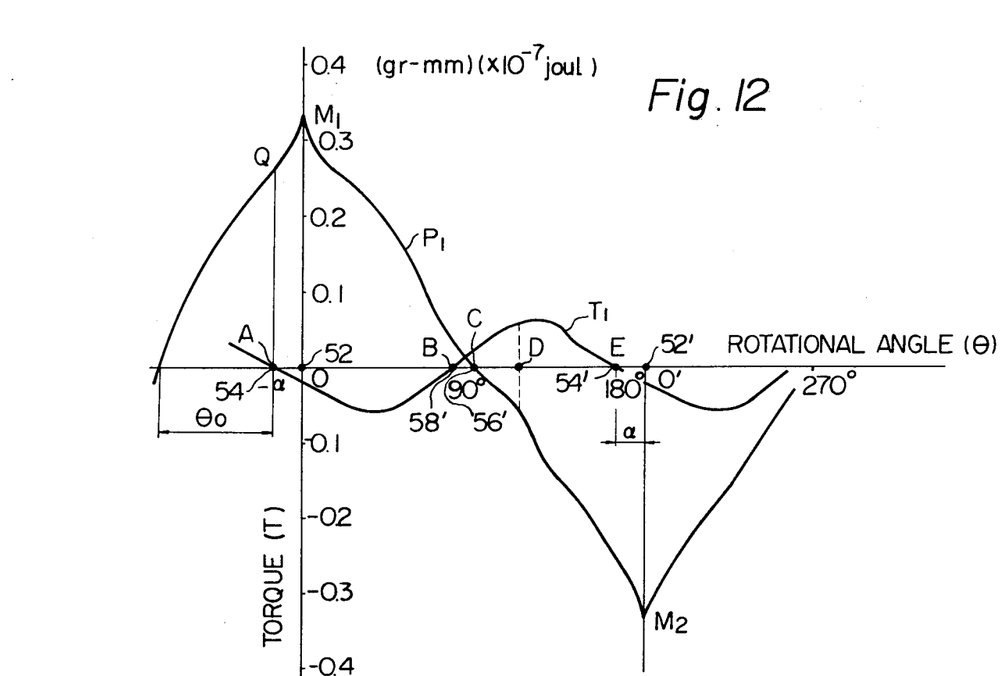
FIG. 12 is a torque diagram illustrating the operation of the stepping motor shown in FIG. 3 during normal rotation.

FIG. 12 shows a torque diagram which is plotted in terms of rotational angle of the rotor of the stepping motor during its normal rotation. In FIG. 12, a curve $P_1$ indicates a driving torque, and a curve $T_1$ indicates an attraction force applied to the rotor of the stepping motor.

Figure 13:
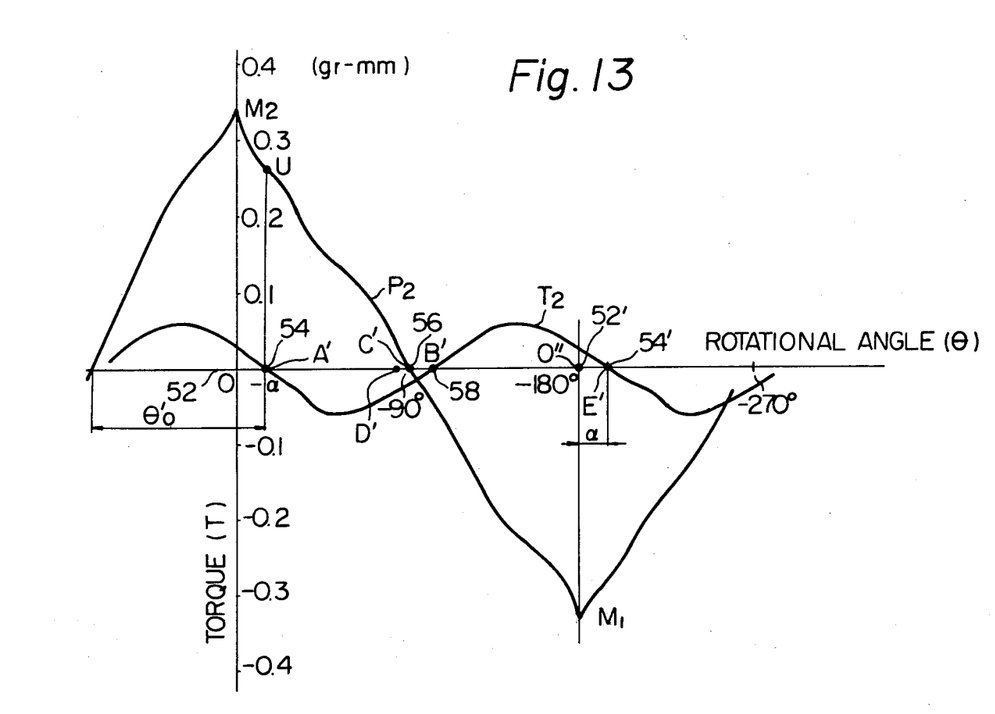
FIG. 13 is a view similar to FIG. 12 but shows a torque diagram in a reverse rotation of the rotor.

FIG. 13 shows a torque curve which is plotted in terms of the rotational angle of the rotor of the stepping motor during its reverse rotation. In FIG. 13, a curve $P_2$ represents a driving torque, and a curve $T_2$ represents an attraction force applied to the rotor of the stepping motor.

Usually, the equation of motion of the reversible stepping motor using a permanent magnet rotor is expressed as follows:

$$J \cdot \frac{d^2\theta}{dt} + \mu \frac{d\theta}{dt} = A(\theta)i(t) - T(2\theta \pm \alpha) - \rho(\theta) \quad (1)$$

$$L \frac{di(t)}{dt} + A(\theta) \frac{d\theta}{dt} + Pi(t) = E \quad (2)$$

where $J$ = moment of inertia of the rotor
$\mu$ = coefficient of fluid resistance
$A$ = torque coefficient or coefficient of electromechanical connection which varies as a factor of $\theta$
$T$ = attraction force between the stator and the rotor which varies as a factor of $2\theta$
$\theta$ = rotational angle of the rotor
$i(t)$ = driving current
$L$ = inductance of the driving coil of the stepping motor $E$ = biasing current
$\alpha$ = phase angle of the attraction force T with respect to the center line of the gaps of the stator pole pieces
$\theta$ = load torque.

The coefficient of the electromechanical connection and the attraction force of the stepping motor used in the electronic timepiece are usually expressed in terms of the center line of the air gaps between the stator pole pieces as follows:

$$A(\theta) = Ao \sin(\theta + \pi/2) \quad (3)$$

$$T(2\theta \pm \alpha) = To \sin(2\theta \pm \alpha) \quad (4)$$

$$P = A(\theta)i(t) = Ao \sin(\theta + \pi/2) \cdot i(t) \quad (5)$$

where $P$ = driving torque.

The curves T and P are illustrated in FIGS. 12 and 13 as already stated hereinabove. During the normal rotation of the rotor, the difference $\theta o$ in phases between the attraction force T and the driving torque P is expressed by $\theta o = \pi/2 - \alpha$. During reverse rotation of the rotor, the difference $\theta o'$ in phases between the attraction force T and the driving torque P is expressed by $\theta o' = \pi/2 + \alpha$. Since the rotor is stable when T=O, the symbol "$\alpha$" represents an angle of static equilibrium relatie to the center line of the air gaps between the stator pole pieces. It is to be noted that the sum of $\theta o$ and $\theta o'$ is equal to a value $\pi$.

Figure 4A:
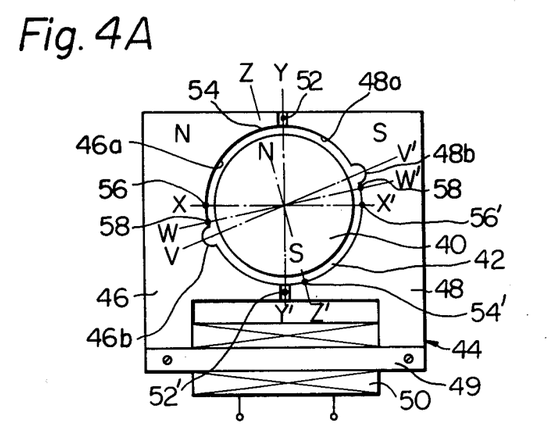
FIGS. 4A through 4C are views illustrating mode of operation of the stepping motor shown in FIG. 3.
Figure 4B:
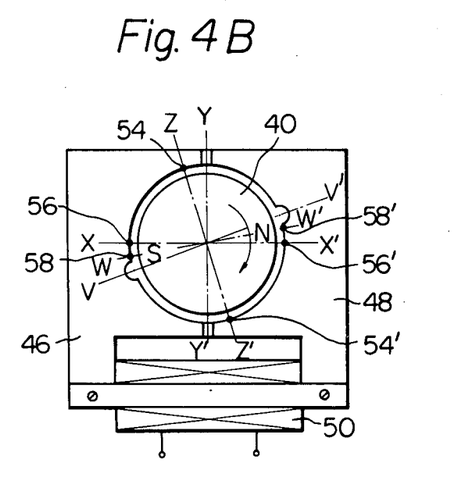

The operation of the stepping motor shown in FIG. 3 will now be described in detail as follows:

In case of normal rotation of the rotor, the rotor 40 is initially stationary under a condition in which the north and south poles of the rotor 40 are aligned with the axis Z-Z' of static equilibrium crossing the static equilibrium points 54 and 54'. The static equilibrium point 54 corresponds to a point A in FIG. 12, and the static equilibrium point 54' corresponds to a point E in FIG. 12. Under this condition, the pulse $\theta_1$ is applied to the driving coil 50 of the stepping motor so that the stator pole piece 46 is energized to a north polarity while the stator pole piece 48 is energized to a south polarity. In this instance, the north pole of the rotor 40 is repulsed by the north polarity of the stator pole piece 46 and attracted by the south polarity of the stator pole piece 48. At the same time, the south pole of the rotor 40 is impulsed by the south polarity of the stator piece 48 and attracted by the north polarity of the stator pole piece 46. Consequently, the rotor 40 is rotated in a normal direction, i.e., clockwise as shown in FIG. 4B. The torque applied to the rotor 40 becomes positive after the rotor 40 has been rotated to a position in which the north pole of the rotor is aligned with the axis W-W' crossing the point 58' corresponding to a point B in FIG. 12 in which $T_1=O$. Accordingly, the rotor 40 is further rotated to a position in which the north pole of the rotor is aligned with the axis Z-Z' of static equilibrium crossing the point 54' corresponding to the point E in FIG. 12. It is to be noted in this instance that even when the supply of pulse $\theta_1$ to the driving coil 50 is interrupted before the north pole of the rotor 40 reaches the point B in FIG. 12, the rotor 40 is rotatable due to its kinetic energy if the pulse width is determined to have the rotor to rotate toward the point B in FIG. 12 by the force which overcomes the opposing torque. While the lower limit in the pulse width is such that the kinetic energy of the rotor is zero at the point B in FIG.

12, it is desired that the pulse width be slightly larger than the lower limit mentioned above to overcome the load torque. While the upper limit in the pulse width is not restricted because the attracton force $T_1$ is in a positive range and the rotor tends to rotate in the normal direction at the point D in which the sum of the driving torque $P_1$ and the attraction force $T_1$ is zero, it is desired that the pulse width be set in the order of, for instance, 16 milliseconds for the sake of minimizing power consumption.

Figure 4C:
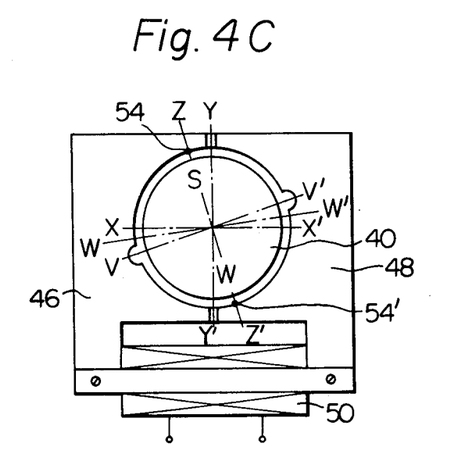

FIG. 4C shows that the rotor 40 is rotated at 180° to a position in which the north pole of the rotor 40 is stable at the static equilibrium point 54' corresponding to the point E in FIG. 12. The waveform of the electric current applied to the driving coil 50 is illustrated in FIG. 10A. In FIG. 10A, a symbol "$\tau$" indicates a pulse width, and broken line represents the waveform of the electric current when the rotor 40 is stopped. FIG. 10B shows the mode of rotation of the rotor. In case of the electronic timepiece employing the stepping motor, the coefficient $\mu$ of fluid resistance is relatively small and, therefore, the rotor is stopped after damped vibrations. While it is possible to brake the stepping motor by increasing the value of the coefficient $\mu$ of the fluid resistance, the power consumption will increase.

As the pulse $\phi_2$ is applied to the driving coil 50 when the rotor 40 remains stable in a position shown in FIG. 4C, the polarities of the stator pole pieces 46 and 48 are reversed so that the north pole of the rotor 40 is repulsed by the north polarity of the stator pole piece 48 and attracted by the south polarity of the stator pole piece 46 while the south pole of the mirror 40 is repulsed by the south polarity of the stator pole piece 46 and attracted by the north polarity of the stator pole piece 48. Thus, the rotor 40 is rotated in the normal direction at 180° to a position shown in FIG. 4A. In this manner, the rotor 40 is rotated in the normal direction by the two-phase pulses alternatively applied to the driving coil 50.

Figure 5A:
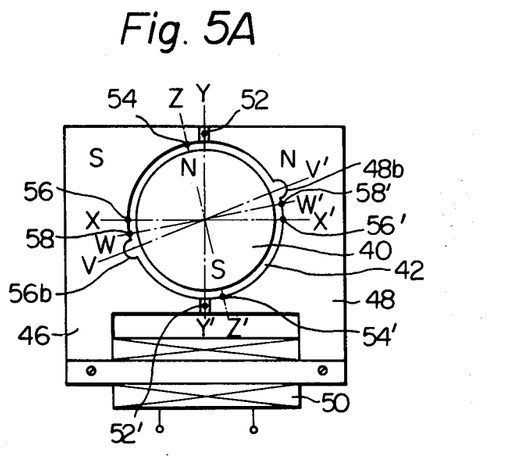
FIGS. 5A through 5C are views similar to FIGS. 4A through 4C but show another mode of operation of the stepping motor shown in FIG. 3.
Figure 5B:
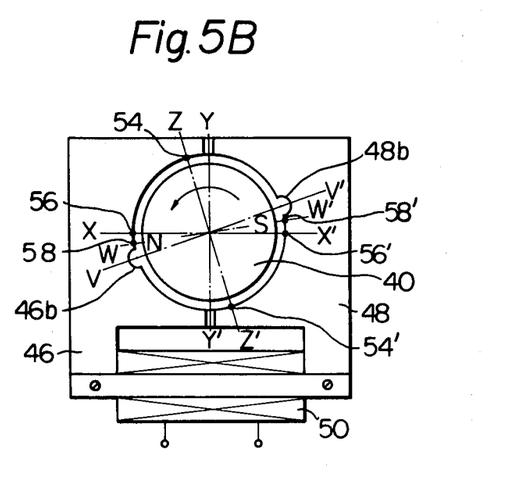

The mode of reverse rotation of the rotor will be described with reference to FIGS. 5A to 5C. FIG. 5A shows the state of the rotor similar to that shown in FIG. 4A. As already mentioned hereinabove, as the pulse $\theta_2$ is applied to the driving coil 50 when the rotor 40 is stable of a position shown in FIG. 4C, the rotor 40 is rotated at 180° to a position shown in FIG. 4A which corresponds to FIG. 5A. Under these conditions, if the pulse $\phi_2$ is applied again to the driving coil 50 in a manner as shown by waveform g in FIG. 8, the stator pole piece 46 is energized to a south polarity while the stator pole piece 48 is energized to a north polarity. In this instance, the rotor 40 is caused to rotate in the reverse direction, i.e., counterclockwise as shown in FIG. 5B by the attraction forces applied to the rotor 40. The driving torque $P_2$ for the rotor is zero at the point 56 corresponding to the point C' in FIG. 13. Since, however, the kinetic energy of the rotor is greater than the negative attraction torque $T_2$, the rotor 40 is rotated to a position shown in FIG. 5B corresponding to the point B' in FIG. 13 in which T=O. In this situation, the rotor 40 is further rotated by the positive attraction force T to a position shown in FIG. 5C, i.e., a position in which the north pole of the rotor 40 reaches the static equilibrium point 54' corresponding to the point E' in FIG. 13. The width of the pulse $\phi_2$ is determined in a manner as already described hereinabove. Since the attraction force $T_2$ has a value within a negative range as shown in FIG. 13 when the sum of the driving power $P_2$ and the attraction force $T_2$ is zero, the rotor 40 is caused to return to the point D' in FIG. 13 if the width of the pulse $\phi_2$ is too large and, when the supply of the pulse $\phi_2$ to the driving coil 50 is stopped, the rotor 40 tends to rotate to the point A' in FIG. 13 corresponding to the static equilibrium point 54'. Therefore, it is desired that the width of the pulse $\phi_2$ be determined to be small and preferably in the order of 16 milliseconds.

As previously described, the rotor 40 is rotated at 180° in the reverse direction in response to the pulse $\phi_2$ and becomes stable at the point E' corresponding to the static equilibrium point 54' after the damped vibrations for about 30 milliseconds. The wave form of the electric current supplied to the driving coil 50 is illustrated in FIG. 11A. In FIG. 11A a symbol "$\tau$" indicates a width of the pulse $\phi_2$. FIG. 11B illustrates the mode of rotation of the rotor 40 when the electric current is applied to the driving coil 50 in a manner shown in FIG. 11A. The rotor is subjected to damped vibrations when the supply of the pulse $\phi_2$ is stopped. However, the damped vibrations will cease earlier than in the normal rotation because the rotational speed of the rotor during reverse rotation is lower than during normal rotation of the rotor.

Figure 5C:
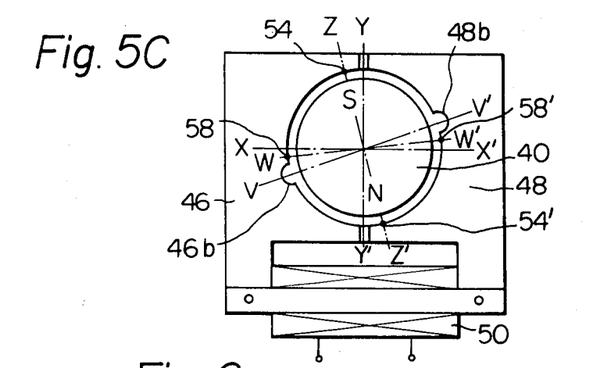

As the pulse $\phi_1$ is applied to the driving coil 50 when the rotor 40 is stable at the position shown in FIG. 5C, the stator pole piece 46 is energized to a north polarity while the stator pole piece 48 is energized to a south polarity. In this condition, the north pole of the rotor 40 is repulsed by the north polarity of the stator pole piece 46 and attracted by the south polarity of the stator pole piece 48 while the south pole of the rotor 40 is repulsed by the south polarity of the stator pole piece 48 and attracted by the north polarity of the stator pole piece 46. Thus, the rotor 40 is caused to rotate at 180° in the reverse direction to a position shown in FIG. 5A. In this manner, the rotor 40 is continuously rotated in the reverse direction in response to the two-phase pulses alternatively applied to the driving coil 50.

In an electronic timepiece equipped with a calender advance mechanism, it is required that the output torque of the stepping motor be larger than the load of the calender mechanism during normal rotation of the stepping motor. Since the stepping motor is rotated in the reverse direction only during second zeroing and the load is small, it is preferable to determine the phase difference $\theta o$ between the driving torque and the attraction force such that the stepping motor provides a maximum efficiency during its normal rotation. The most pertinent value in the phase difference ranges from 60° to 90° by an electrical angle for the normal rotation of the rotor and ranges from 120° to 90° for the reverse rotation of the rotor. In this case, the angle $\alpha$ of static equilibrium ranges from 0° to 30°. In a case where it is desired to obtain the same operating characteristics for the normal and reverse rotations of the rotor, the phase difference $\theta o$ between the driving torque and the attraction force is determined to have value of 90°. In this case, the static equilibrium angle is zero and the operating characteristic of the stepping motor will be slightly lowered during normal rotation of the rotor.

If the phase difference between the driving torque and the attraction force for the reverse rotation of the rotor is set to a value greater than 120° such that the driving torque becomes zero before the attraction force reaches its maximum value, the rotor can not be rotated to the point B' in FIG. 13 so that the rotor can not be rotated in the reverse direction and, thus, the rotor is rotatable only in the normal direction.

Figure 14:
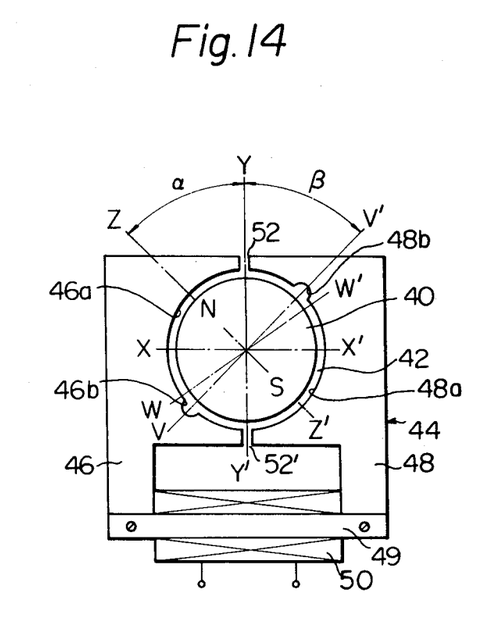
FIG. 14 is a schematic view of a modified form of the stepping motor shown in FIG. 3.

A modified form of the stepping motor is illustrated in FIG. 14, in which like or corresponding component parts are designated by the same reference numerals as those in FIG. 3. This modification is similar in construction except that the indented portions 46b and 48b are provided on the axis V-V' at an angle $\beta$, below 60° whereby the axis Z-Z' of static equilibrium is at an angle $\alpha$, above 30° and, therefore, the rotor 40 can be rotated in a single direction.

Figure 15:
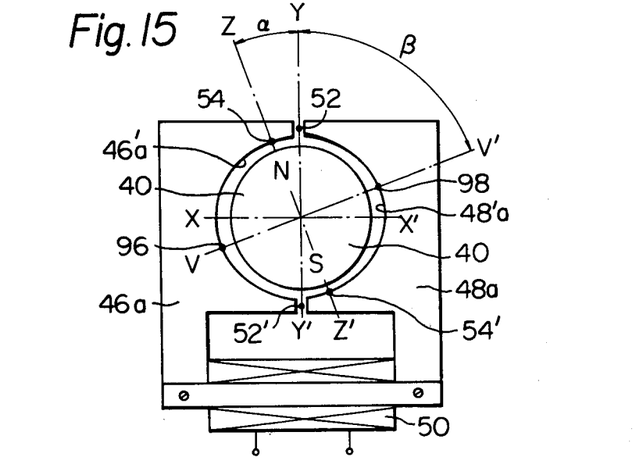
FIG. 15 is a schematic view of another modified form of the stepping motor shown in FIG. 3.

FIG. 15 illustrates another modified form of the stepping motor of the present invention. In this illustrated modification, the stator pole pieces 46 and 48 have oval-shaped inner peripheries 46'a and 48'a of which apices 96 and 98 lie on the axis V-V' at an angle $\beta$ with respect to the center line Y-Y' of the air gaps 52 and 52' between the stator pole pieces 46 and 48. With this arrangement, the static equilibrium points 54 and 54' lie on the axis Z-Z' at an angle $\alpha$ with respect to the center line Y-Y'. The stepping motor shown in FIG. 15 will operate in a manner similar to that of FIG. 3 and, therefore, a detailed decription of the same is herein omitted. Each of the oval-shaped inner peripheries of the stator pole pieces may be formed by two arcs having different centers of curvature if desired.

Figure 16:
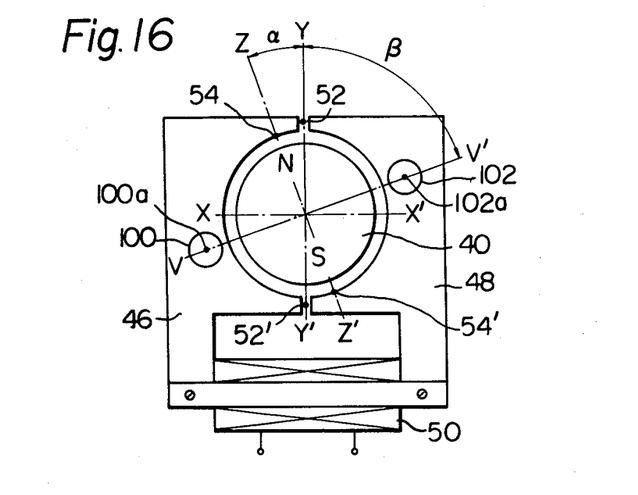
FIG. 16 is a schematic view of another modified form of the stepping motor shown in FIG. 3.

FIG. 16 shows a further modified form of the stepping motor of the present invention. In this illustrated modification, the indented portions 46b and 48b are replaced by hollow portions 100 and 102 which are formed in the stator pole pieces 46 and 48. The centers 100a and 102a of the hollow portions 100 and 102 lie on the axis V-V' at an angle $\beta$ with respect to the center line Y-Y' so that the static equilibrium points 54 and 54' lie on the axis Z-Z' at an angle $\alpha$. The stepping motor shown in FIG. 16 will operate in a manner similar to that shown in FIG. 3 and, therefore, a detailed description of the same is omitted.

Although the stator pole pieces 46 and 48 have been shown and described as being spaced from each other by the air gaps 52 and 52', it should be noted that the present invention may be applied to a stepping motor in which the air gaps are dispensed with.

It will now be understood from the foregoing description that in accordance with the present invention a stepping motor can be simplified in construction with the use of minimum number of components and particularly suited for use in an electronic timepiece such as a wrist watch in which spacing for each component is limited.

It will also be noted that a stepping motor of the present invention can be rotated either in normal or reverse direction by merely changing the order of supply of alternating current pulses into a single driving coil. The stepping motor is comprised of two stator pole pieces in addition to the single driving coil and, therefore, the stepping motor can be miniaturized.

It will further be appreciated that in a case in which a stepping motor of the present invention is applied to a wrist watch it is possible to achieve time correction within the shortest period of time by quickly advancing or retarding the hours hand minutes hand or seconds hand by applying a time correction pulse of a frequency higher than that normally applied to the driving coil of the stepping motor. The control switch for producing the time correction pulse may be associated with an external control switch such as a push button and, in this case, a crown may be dispensed with. In addition, a memory circuit may be provided to store the angular positions of the hours hand, minutes hand or seconds hand for thereby producing a number of time correction pulses corresponding in number to the numerical value stored in the memory circuit during time correction, which pulses are applied to the driving coil of the stepping motor whereby quick time correction can be achieved.

It will also be born in mind that a stepping motor of the present invention may be unidirectional without using any complicated components whereby assembling is simple and manufacturing cost is low.

While the present invention has been shown and described with reference to particular embodiments, it should be noted that various changes and modifications may be made without departing from the scope of the present invention.

What is claimed is:

1. A reversible stepping motor comprising:
   stator pole pieces having inwardly rounded peripheries and spaced from each other by air gaps, said stator pole pieces having indentations formed on said rounded peripheries on an axis angled at substantially 60° with respect to a center line of said air gaps, respectively, to provide an axis of static equilibrium at an angle of substantially 30° with respect to said center line of said air gaps, and said stator pole pieces being magnetically connected to each other by a magnetically conductive member on which a driving coil is wound;
   a permanent magnet rotor rotatably mounted in a space defined between said rounded peripheries of said stator pole pieces and having a pair of North and South poles in a radial direction; and
   a driver circuit connected to said driving coil and including gate means connected to a source of clock pulses to alternately apply two-phase pulses to said driving coil to alternately energize said stator pole pieces in North and South polarities for thereby causing said rotor to rotate in a normal direction, and circuit means connected to switch means and responsive to a switching signal delivered therefrom to cause said gate means to change the order of supply of said two-phase pulses being applied to said driving coil within a predetermined time interval for thereby permitting the reverse rotation of said rotor.

2. A reversible stepping motor according to claim 1, in which said gate means comprises first and second gates having one inputs connected to said source of clock pulses, and third and fourth gates connected between the other inputs of said first and second gates and an output of said circuit means for controlling said first and second gates in response to said switching signal.

3. A reversible stepping motor according to claim 2, in which said circuit means comprises first and second flip-flop circuits connected to inputs of said third and fourth gates, respectively, said first and second flip-flops being normally responsive to outputs from said second and first gates to cause said first and second gates to alternately apply said two-phase pulses to said driving coil, and said second flip-flop being responsive to said switching signal to inhibit one of said first and second gates while opening the other of said first and second gates within said predetermined time interval.

4. In an electronic timepiece having a frequency standard, a frequency divider connected to the frequency standard, and a waveform shaping circuit connected to the frequency divider to provide two-phase clock pulses, a reversible stepping motor comprising:

stator pole pieces having inwardly rounded peripheries and spaced from each other by air gaps, said stator pole pieces having indentations formed on said rounded peripheries on an axis angled at substantially 60° with respect to a center line of said air gaps, respectively, to provide an axis of static equilibrium at an angle of substantially 30° with respect to said center line of said air gaps, and said stator pole pieces being magnetically connected to each other by a magnetically conductive member on which a driving coil is wound;

a permanenent magnet rotor rotatably mounted in a space defined between said rounded periphries of said stator pole pieces and having a pair of North and South poles in a radial direction; and a driver circuit connected to said driving coil and including gate means connected to said waveform shaping circuit and responsive to said two-phase clock pulses to alternatiely provide driving current pulses to said driving coil to alternately energize said stator pole pieces in North and South polarities for thereby causing said rotor to rotate in a normal direction, and circuit means connected to switch means and responsive to a switching signal delivered therefrom to cause said gate means to change the order of supply of said driving current pulses being applied to said driving coil within a predetermined time interval for thereby permitting the reverse rotation of said rotor.

5. A reversible stepping motor according to claim 4, in which said gate means comprises first and second gates having one inputs connected to said source of clock pulses, and third and fourth gates connected between the other inputs of said first and second gates and an output of said circuit means for controlling said first and second gates in response to said switching signal.

6. A reversible stepping motor according to claim 5, in which said circuit means comprises first and second flip-flop circuits connected to inputs of said third and fourth gates, respectively, said first and second flip-flops being normally responsive to outputs from said second and first gates to cause said first and second gates to alternately apply said driving current pulses to said driving coil, and said second flip-flop being responsive to said switching signal to inhibit one of said first and second gates while opening the other of said first and second gates within said predetermined time interval.

* * * * *